(12) United States Patent
Lodise et al.

(10) Patent No.: US 6,505,606 B2
(45) Date of Patent: *Jan. 14, 2003

(54) MOTORCYCLE HAVING A SYSTEM FOR COMBUSTION KNOCK CONTROL

(75) Inventors: V. Dennis Lodise, Pewaukee, WI (US); Eric Norppa, Pewaukee, WI (US); Frederick K. Lenhart, Kokomo, IN (US); Michael Martin, Greentown, IN (US)

(73) Assignees: Harley-Davidson Motor Company Group, Inc., Milwaukee, WI (US); Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/098,728

(22) Filed: Mar. 15, 2002

(65) Prior Publication Data

US 2002/0088432 A1 Jul. 11, 2002

Related U.S. Application Data

(63) Continuation of application No. 09/619,992, filed on Jul. 20, 2000, now Pat. No. 6,386,183.

(51) Int. Cl.[7] .............................. F02P 5/15; G01L 23/22
(52) U.S. Cl. ................. 123/406.21; 73/35.08; 123/406.37; 123/435
(58) Field of Search ....................... 123/406.21, 406.37, 123/406.39, 435; 73/35.08; 180/218

(56) References Cited

U.S. PATENT DOCUMENTS

| | | |
|---|---|---|
| 4,307,603 A | 12/1981 | Dobler et al. |
| 4,648,367 A | 3/1987 | Gillbrand et al. |
| 4,862,093 A | 8/1989 | Jiewertz |
| 5,174,263 A | 12/1992 | Meaney |
| 5,608,632 A | 3/1997 | White |
| 5,653,209 A | 8/1997 | Johansson et al. |
| 5,676,113 A | 10/1997 | Johansson et al. |
| 5,694,900 A | 12/1997 | Morita et al. |
| 5,769,049 A | 6/1998 | Nytomt et al. |
| 5,775,298 A | 7/1998 | Haller |
| 5,803,047 A | 9/1998 | Rask |
| 5,896,842 A | 4/1999 | Abusamra |
| 5,907,243 A | 5/1999 | Goras et al. |
| 5,924,404 A | 7/1999 | Ruman et al. |
| 5,992,376 A | 11/1999 | Nytomt et al. |
| 6,029,640 A | 2/2000 | Bengtsson et al. |
| 6,032,650 A | 3/2000 | Rask |
| 6,230,546 B1 | 5/2001 | Wilstermann et al. |
| 6,386,183 B1 * | 5/2002 | Lodise et al. .......... 123/406.21 |

* cited by examiner

Primary Examiner—Tony M. Argenbright
(74) Attorney, Agent, or Firm—Michael Best & Friedrich LLP (57) ABSTRACT

A motorcycle having a system for combustion knock control. The motorcycle includes a spark generating circuit having a spark plug. The spark generating circuit produces a spark across a spark gap of the spark plug in response to a sparking signal. The motorcycle further includes an ion signal circuit that provides an ion signal indicative of an ion current being generated across the spark gap, and an analysis module electrically connected to the ion signal circuit and the spark generating circuit. The analysis module generates the sparking signal in a timed sequence, receives the ion signal from the ion signal generating circuit, measures a knock intensity within the ion signal, and modifies the timing sequence when knock is present.

22 Claims, 10 Drawing Sheets

MOTORCYCLE HAVING A SYSTEM FOR COMBUSTION KNOCK CONTROL

RELATED APPLICATION

This application is a continuation of and claims the Title 35, United States Code, §120 of the U.S. patent application Ser. No. 09/619,992, entitled MOTORCYCLE HAVING SYSTEM FOR COMBUSTION KNOCK CONTROL, filed on Jul. 20, 2000, granted U.S. Pat. No. 6,386,183.

FIELD OF THE INVENTION

The present invention relates to combustion knock control in an internal combustion engine, and particularly to combustion knock control in a two-cylinder, V-twin, air-cooled motorcycle engine.

BACKGROUND OF THE INVENTION

In the ideal condition, combustion in an engine's combustion chamber propagates from the spark plug through the combustible mixture along a controlled combustion wave. Knock occurs when spontaneous combustion happens ahead of the combustion wave, resulting in power loss for the engine. Knock is produced by spontaneous combustion or autoignition. Knock occurs when the local pressure and heat within the combustion chamber is above the requisite local pressure and heat required for spontaneous combustion.

It is known to control knock in a four-cylinder, water-cooled automobile engine. One method entails obtaining an ion signal representative of ionization across the spark gap of a spark plug. After obtaining the ion signal, a controller detects whether knock is present within the combustion chamber. If the controller detects knock, then the controller will vary the timing of the spark event. However, prior art two-cylinder, air-cooled motorcycle engines did not control knock within the engine, and were forced to accept the resulting loss of power. One reason for this is that prior art motorcycles did not have the necessary control and processing power required to implement knock control.

SUMMARY OF THE INVENTION

One of the problems with two-cylinder, air-cooled engines (e.g., motorcycle engines) is that the engines run much hotter than water-cooled engines (e.g., automobile engines). The most obvious reason for this is that water-cooled engines use a coolant for promoting heat removal, whereas air-cooled engines rely substantially on air-flow for heat removal. This problem is intensified if the motorcycle is running in warm surroundings. The increased running temperature of the motorcycle engine results in an increased temperature within the combustion chamber and, consequently, the motorcycle engine is more susceptible to knock.

A second problem that arises with two-cylinder, air-cooled motorcycle engines is that air-cooled engines have a larger engine temperature range than water-cooled engines. That is, because air-cooled engines do not contain a liquid coolant, the engine temperature varies over a larger temperature range than water-cooled engines. Due to the larger temperature range, it is more difficult to calibrate against or control engine knock. Even further, a large number of motorcycle engines are calibrated close to the knock limit. These motorcycle engines are calibrated at peak pressure because that is the point where the most amount of output power for the engine results. In normal ambient conditions this does not result in a problem. But at elevated temperatures, knock can be an issue.

Knock is even more prevalent in two-cylinder, V-twin, air-cooled motorcycle engines having one cylinder positioned in front of the other. In such an engine engine, the rear cylinder typically runs hotter than the front cylinder because the rear cylinder receives less airflow then the front cylinder. The increased temperature for the rear cylinder results in the rear cylinder being more susceptible to knock than the front cylinder. Therefore, it would be beneficial to create a controller for performing knock control in a two-cylinder, V-twin, air-cooled motorcycle engine.

The invention provides a motorcycle including a frame, front and rear wheels coupled to the frame for rotation with respect to the frame, and a two-cylinder engine mounted to the frame. The engine includes a housing, a crankshaft mounted for rotation within the housing, first and second cylinders having first and second combustion chambers, respectively, and first and second pistons reciprocating in the first and second cylinders, respectively. The engine of the motorcycle is preferably a two-cylinder, V-twin, air-cooled engine having one cylinder positioned in front of the other. The motorcycle further includes a spark generating circuit including a spark plug having a spark gap exposed to the first combustion chamber. The spark generating circuit produces a spark across the spark gap in response to a sparking signal. The motorcycle further includes an ion signal circuit that provides an ion signal indicative of an ion current being generated across the spark gap. The motorcycle further includes an analysis module electrically connected to the ion signal circuit and the spark generating circuit. The analysis module generates the sparking signal in a timed sequence, receives the ion signal from the ion signal generating circuit, measures a knock intensity within the ion signal, and modifies the timing sequence in response to an indication of knock in the first cylinder.

The motorcycle can further include a fuel injector having a fuel injector circuit. The fuel injector provides an amount of fuel to the combustion chamber in response to a fuel injector signal being provided to the fuel injector circuit. The fuel injector circuit is electrically connected to the analysis module. The analysis module generates the fuel injector signal and modifies the fuel injector signal in response to an indication of knock within the first cylinder.

The motorcycle further includes a second spark generating circuit substantially identical to the first spark generating circuit and a second ion signal circuit for use with the second cylinder. The analysis module is electrically connected to the second ion signal circuit and the second spark generating circuit and functions as described above to modify the second timing sequence. The provision of a second circuit facilitates separate control of the first and second cylinders.

The analysis module includes a low-pass filter. The low-pass filter receives the ion-signal from the ion signal generating circuit and passes a low-pass signal having low frequencies. The analysis module further includes a band-pass filter having a frequency range. The band-pass filter receives the low-pass signal from the low-pass filter and passes a band-pass signal having frequencies within the frequency range. The analysis module further includes an integrator that receives the band-pass signal and provides an integrated signal indicating an amount of knock energy in the band-pass signal. The analysis module further includes a microprocessor electrically connected to the integrator. The microprocessor receives the integrated signal and implements a software program for determining whether the integrated signal represents knock being present within the cylinder.

The invention further provides a motorcycle including a frame, front and rear wheels coupled to the frame for rotation with respect to the frame, and a two-cylinder, V-twin, air-cooled engine mounted to the frame. The engine includes a housing, a crankshaft mounted for rotation within the housing, first and second cylinders having first and second combustion chambers, respectively, and first and second pistons reciprocating in the first and second cylinders, respectively. The motorcycle further includes a spark generating circuit including a spark plug having a spark gap exposed to the first combustion chamber. The spark generating circuit produces a spark across the spark gap in response to a sparking signal. The motorcycle further includes an ion signal circuit that generates an ion signal indicative of an ion current being generated across the spark gap. The motorcycle further includes a conditioning chip that receives the ion signal and generates a knock intensity signal. The motorcycle further includes a processor and software for operating the processor to provide a sparking signal at a timed sequence, to determine whether the knock intensity signal represents knock within the first cylinder, and to modify the timed sequence in response to an indication of knock in the first cylinder.

The invention further provides a method of varying a spark event in a two-cylinder cylinder engine of a motorcycle. The method includes the act of providing a motorcycle including a frame, front and rear wheels coupled to the frame for rotation with respect to the frame, and a two-cylinder engine mounted to the frame. The engine includes a housing, a crankshaft mounted for rotation within the housing, first and second cylinders having first and second combustion chambers, respectively, and first and second pistons reciprocating in the first and second cylinder, respectively. The motorcycle further includes a spark generating circuit including a spark plug having a spark gap exposed to the first combustion chamber.

The method further includes the acts of generating a first spark in the first combustion chamber with the first spark plug when the first piston is in a first position, obtaining an ion signal indicative of an ion current across the first spark plug gap, determining if the ion signal indicates knock within the first cylinder, and generating a second spark in the first combustion chamber with the first spark plug when the piston is in a second position and in response to an indication of knock in the first cylinder. The second position is different than the first position.

The invention further provides a software program for determining whether knock is present within a V-twin, air-cooled, motorcycle engine. The software program detects knock by repeatedly sampling a position signal indicative of a position of a first piston in a first cylinder, generating a first spark signal resulting in a first spark being generated in the first cylinder when the piston is in a first position, sampling a knock intensity portion of an ion signal, providing a threshold value, comparing the sample with the threshold value to determine if knock is present within the first cylinder, and generating a second spark signal resulting in a second spark being generated in the first combustion chamber when the piston is in a second position and in response to knock being present in the first cylinder.

Other features and advantages of the invention will become apparent to those skilled in the art upon review of the following detailed description, claims, and drawings.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

Figure 1:
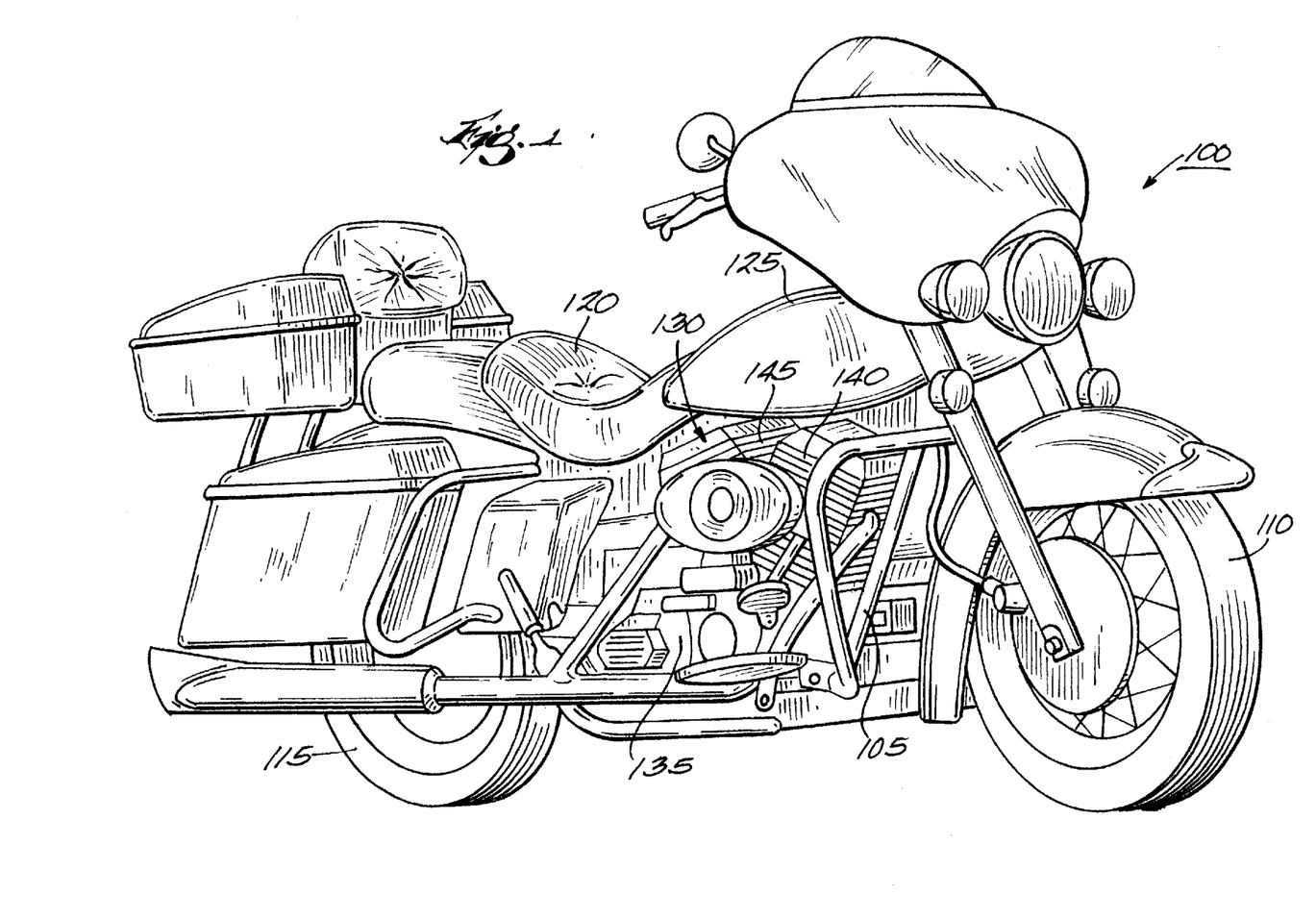
FIG. 1 is a perspective view of a motorcycle embodying the invention.

A motorcycle 100 embodying the invention is shown in FIG. 1. The motorcycle includes a frame 105, front and real wheels 110 and 115, a seat 120, a fuel tank 125, and an engine 130. The front and rear wheels 110 and 115 rotate with respect to the frame 105 and support the frame 105 above the ground. The engine 130 is mounted to the frame 105 and drives the rear wheel 115 through a transmission 135 and drive belt (not shown). The seat 120 and fuel tank 125 are also mounted to the frame 105. The engine 130 shown in FIG. 1 is a two cylinder, air-cooled, V-twin engine having first and second cylinders 140 and 145 (e.g., front and rear cylinders, respectively).

Figure 2:
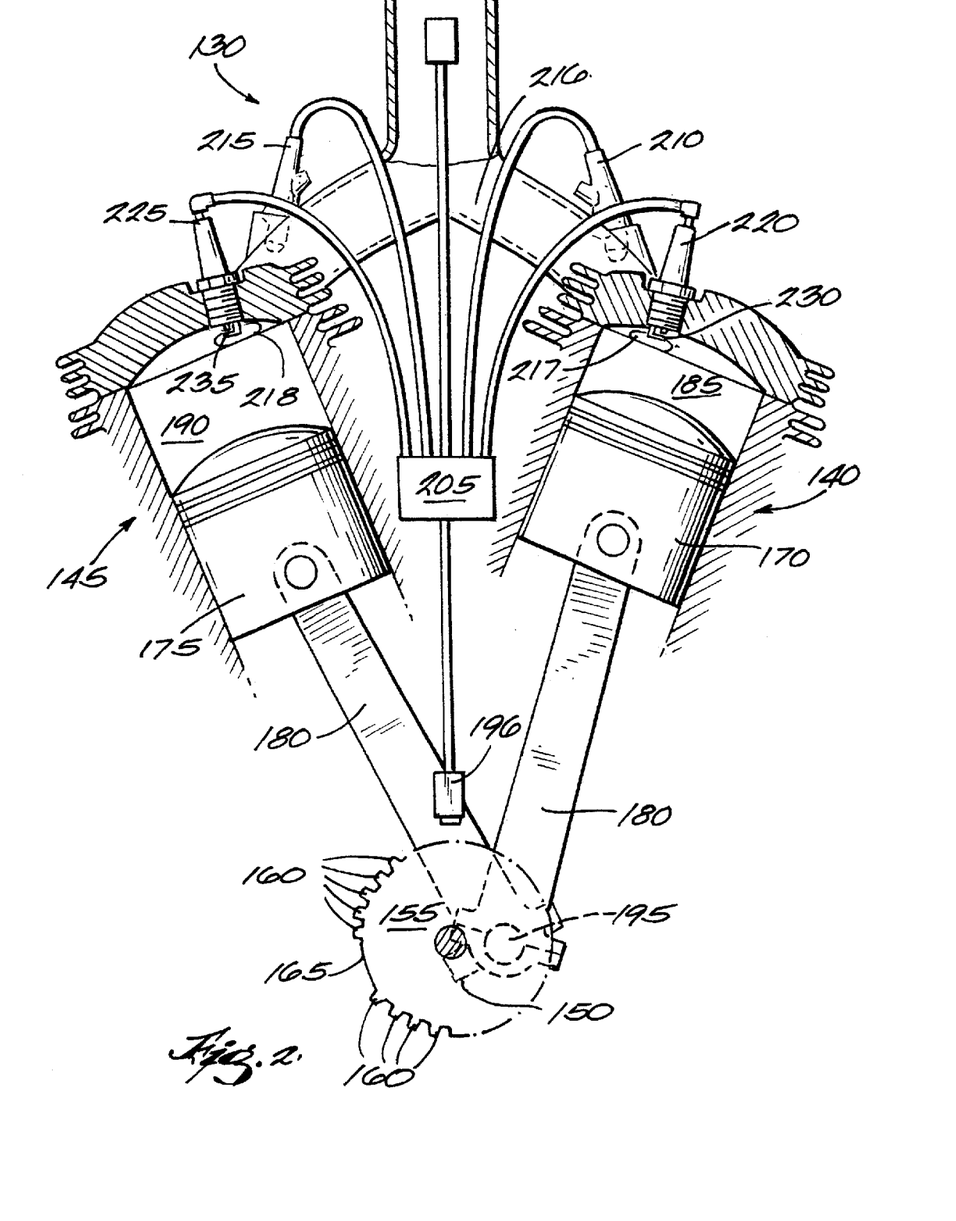
FIG. 2 is a schematic representation of the engine of the motorcycle illustrated in FIG. 1.

Referring to FIG. 2, the engine includes a crankshaft 150 having a crank gear 155 mounted thereto for rotation therewith. The illustrated crank gear 155 has teeth 160 sized and spaced to provide thirty-two teeth around the circumference of the crank gear 155. Two of the teeth have been removed, and provide a space on the crank gear 155. The space is referred to herein as an indicator 165. In this regard, the crank gear 155 includes thirty teeth 160 and the indicator 165 occupying the space where two additional teeth have been removed or not provided. Alternatively, the indicator 165 may be provided by an extra tooth on the crank gear or any other suitable device for indicating a specific location on the crankshaft.

The first and second cylinders 140 and 145 include first and second pistons 170 and 175, respectively, connected to the crankshaft 150 with connecting rods 180. The first and second cylinders 140 and 145 have first and second combustion chambers 185 and 190, respectively. The illustrated crankshaft 150 has a single crankpin 195 to which both of the connecting rods 180 are attached. A crankshaft velocity sensor 196 is mounted on the engine 130, preferably near the crank gear 155. The crankshaft velocity sensor 196 and crankshaft sensor circuitry 200 (schematically shown in FIG. 3) provide a crankshaft velocity signal to an analysis module 205. From the crankshaft velocity signal, the analysis module 205 is able to determine the location of the first and second pistons 170 and 175 within the first and second cylinders 140 and 145 and issue a crankshaft position signal corresponding thereto. For example, based on the crankshaft position signal, the processor may sense the location of the indicator 165 and count the teeth 160 to determine that the first piston 140 is at top-dead-center, while the second piston 145 is at some other position. An exemplary method for determining the location of the first and second pistons 170 and 175 in the first and second cylinders 140 and 145 is disclosed in U.S. patent application Ser. No. 09/620,014, entitled MOTORCYCLE HAVING SYSTEM FOR DETERMINING ENGINE PHASE, filed Jul. 20, 2000, the entire contents of which are incorporated herein by reference. Of course other sensors and/or methods can be used to determine the location of the first and second pistons 170 and 175 within the first and second cylinders 140 and 145.

The engine 130 further includes first and second fuel injectors 210 and 215 mounted on the engine near the first and second cylinders 140 and 145, respectively. The first fuel injector 210 injects fuel into an intake manifold 216 near a first intake valve 217 upon a signal being provided to the fuel injector 210. The first fuel injector signal is provided to the first fuel injector by first fuel injector circuitry 219 (FIG. 3) and is generated by the analysis module 205. Similarly, the second fuel injector 215 injects fuel into the intake manifold 216 near the second intake valve 218 upon a signal being provided to the second fuel injector 215. The second fuel injector signal is provided to second fuel injector circuitry 221 (FIG. 3) and is generated by the analysis module 205. The first and second fuel injectors 210 and 215, first and second fuel injector circuitry 219 and 221 are well known and will not be discussed in greater detail.

Figure 3:
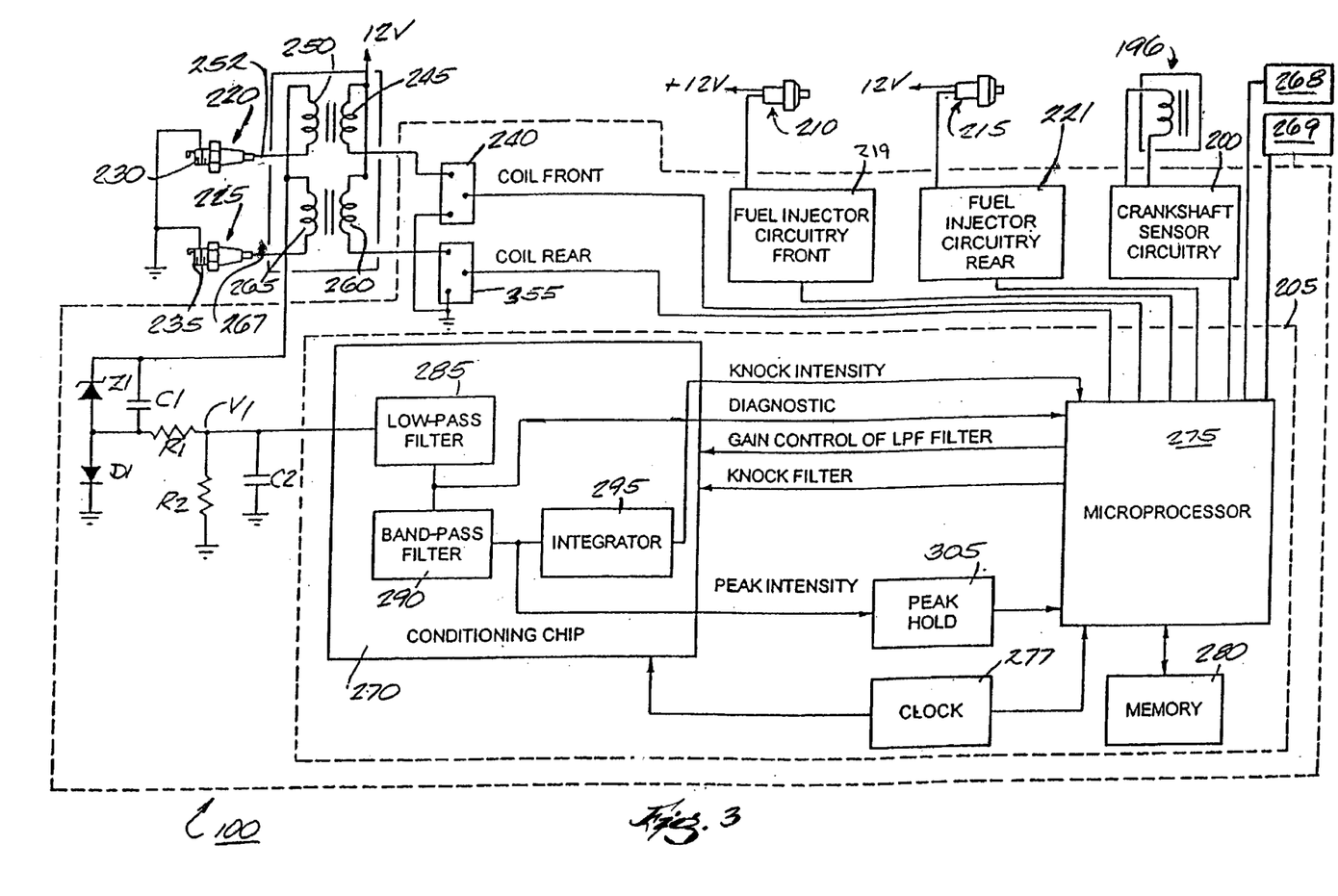
FIG. 3 is a schematic representation of the control circuit of the motorcycle illustrated in FIG. 1.

The engine 130 further includes first and second spark plugs 220 and 225 for the cylinders 140 and 145, respectively. The first and second plugs 220 and 225 include first and second spark gaps 230 and 235, respectively, exposed to the first and second chambers 185 and 190, respectively. A first spark generating circuit creates a first spark signal that causes a spark across the gap 230. As shown in FIG. 3, the spark generating circuit includes first switch 240, first primary winding or coil 245, first secondary winding or coil 250, and the spark plug 220. Similarly, a second spark is created across the second spark gap 235 when a spark signal is applied to the second spark plug 225. The second spark signal is created by a second spark generating circuit, which includes second switch 255, second primary winding or coil 260 and second secondary winding or coil 265, and the spark plug 225.

Referring to FIG. 3, the motorcycle 100 further includes a first ion sensing circuit. The first ion sensing circuit includes first spark plug 220, first secondary coil 250, zener diode Z1, diode D1, capacitors C1 and C2, and resistors R1 and R2. The first ion sensing circuit registers a first ion signal at V1 having a relationship to the ion current created across the first spark gap 230.

The motorcycle 100 further includes a second ion sensing circuit. The second ion sensing circuit includes the second spark plug 225, the second secondary coil 265, the zener diode Z1, the diode D1, the capacitors C1 and C2, and the resistors R1 and R2. The second ion sensing circuit registers a second ion signal at V1 having a relationship to the ion current that is created across the second spark gap 235.

The motorcycle 100 further includes a means for determining whether knock is present within the first and second cylinders. The means for determining whether knock is present within the first and second ion signal can be fully implemented using an application-specific integrated circuit (ASIC), or a microprocessor implementing a software program. Alternatively, as shown in FIG. 3, the means for determining whether knock is present within the first and second cylinders can be a combination of both an integrated circuit and a microprocessor 275.

The motorcycle 100 further includes an analysis module 205 having a conditioning chip 270, a microprocessor 275, a clock 277, peak hold memory 305 and memory 280. The conditioning chip 270 includes a low-pass filter 285, a band-pass filter 290 and an integrator 295. The memory 280 includes memory for storing a knock detecting program and for storing data including knock intensity values. The microprocessor 275 includes an analog-to-digital (A/D) converter (not shown) for receiving signals from the conditioning chip 270 and the crankshaft sensor 200. The microprocessor 275 further includes a digital-to-analog (D/A) converter (not shown) for generating signals to the conditioning chip 270, the first and second spark generating circuits, and the first and second fuel injectors 210 and 215. In addition, the microprocessor 275 receives the software program of the invention from memory 280 and implements it accordingly.

In addition, the motorcycle 100 may include additional engine sensors not shown in the figures. For example, the motorcycle may include an engine temperature sensor and/or a manifold pressure sensor. Since these sensors are known in the art, they will not be discussed in detail.

In operation, the microprocessor 275 executes a software program that interacts with the engine 130 to implement the invention. The software instructs the microprocessor 275 to separately control the first and second fuel injectors 210 and 215, and to separately control the first and second spark plugs 220 and 225 for providing combustion in the engine 130. However, because the combustion of each cylinder 140 or 145 is similar, only the combustion of the first cylinder 140 will be discussed in detail. In addition, although the software of the invention can determine if knock is present within each chamber after the motorcycle has first started, it is preferable that the software is implemented after the engine has combusted for a period of time (i.e., "heated-up").

Figures 4, 4A:
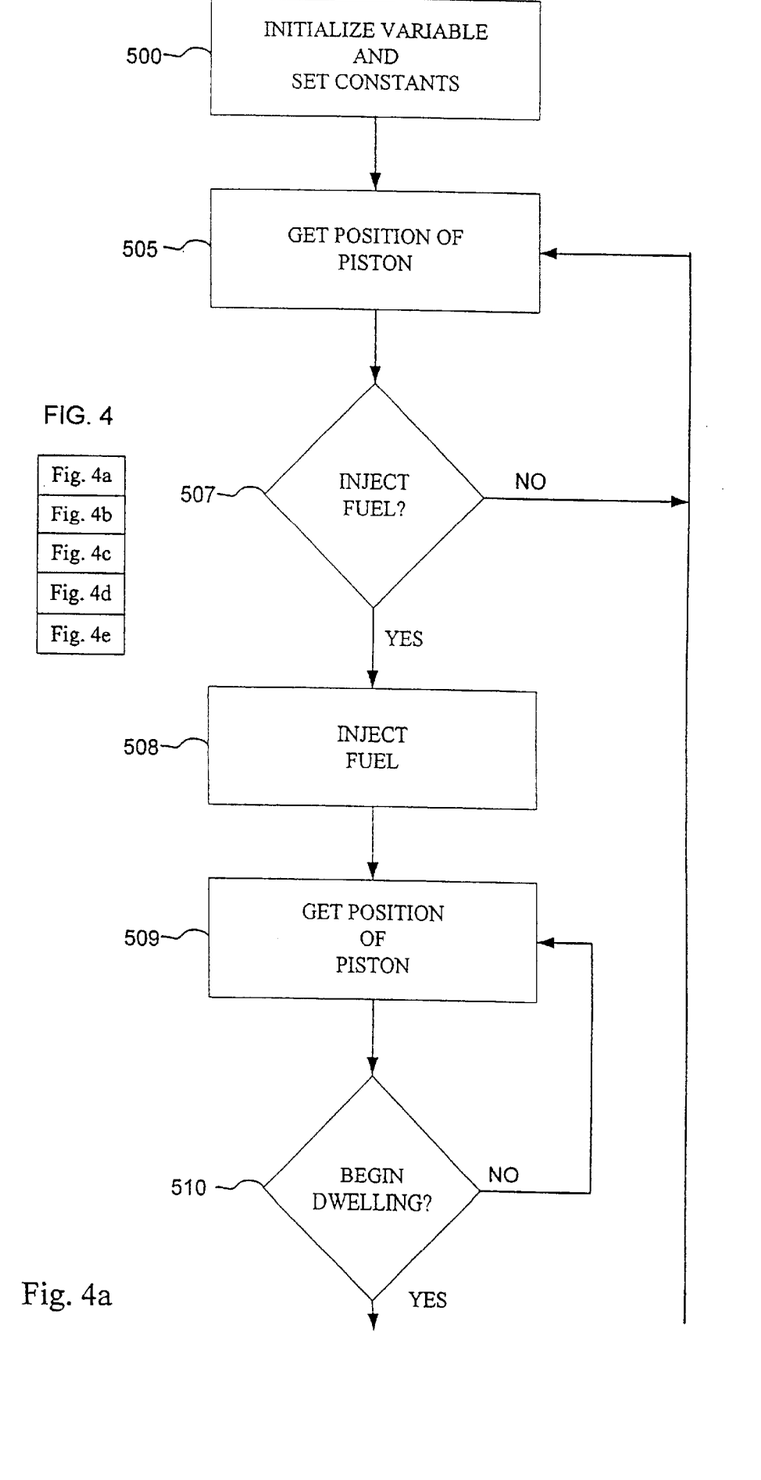
FIGS. 4 and 4a–4e are a flow chart implementing one embodiment of the method of the invention.
Figure 4B:
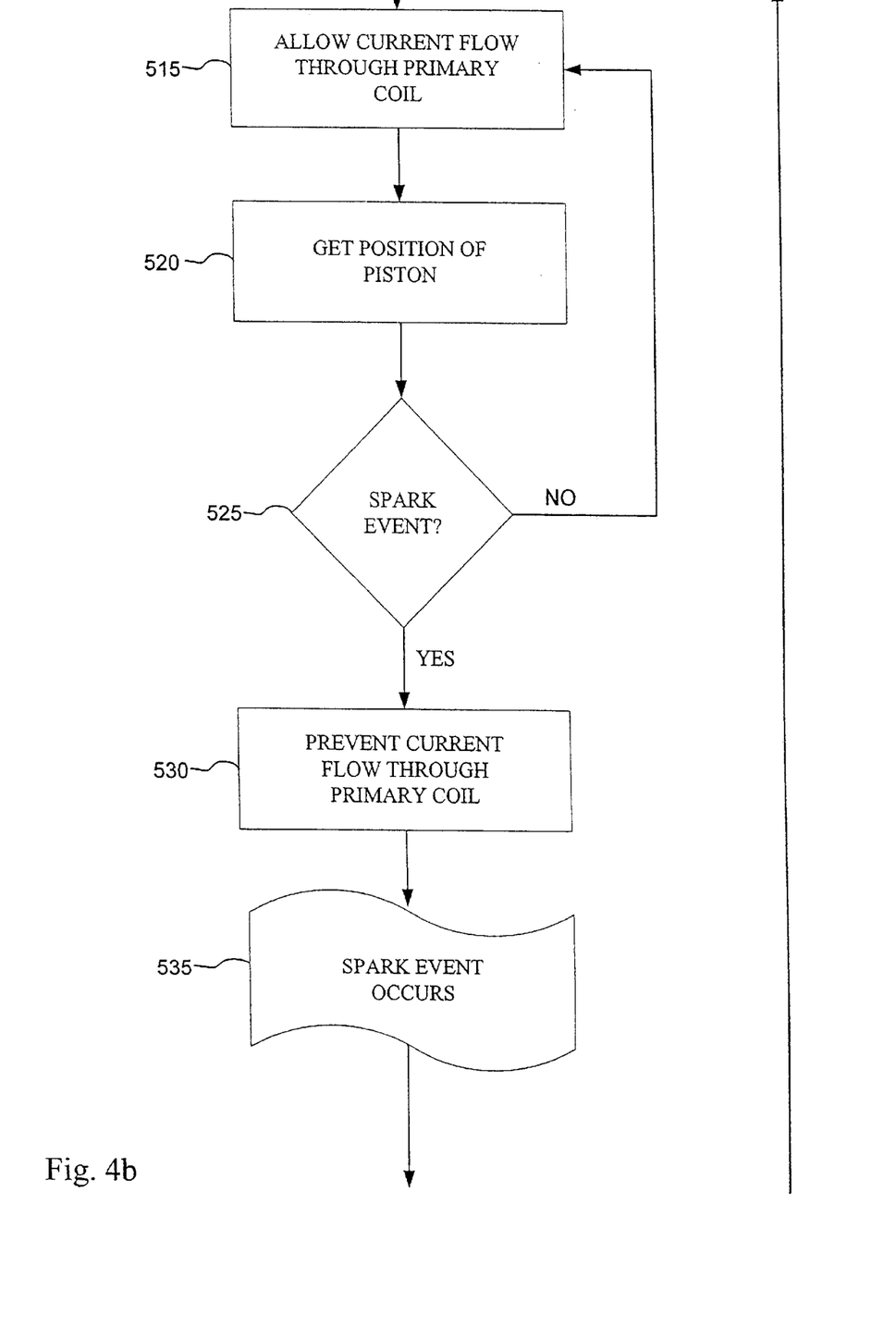

The various acts that make up the method will now be described with reference to FIG. 4. At act 500, the microprocessor 275 initializes variables to initial values and sets constant values to their respective values. For example, the software maintains a variable for when the spark event occurs. The spark event variable may be set to an initial value (e.g., spark at 5 degrees before top-dead-center in the compression stroke). Other variables are similarly initialized.

At act 505, the microprocessor 275 determines the position of the first piston 170 within the cylinder 140. Preferably the microprocessor 275 determines the first piston 170 position by sampling the crankshaft velocity signal generated by the crankshaft sensor 196. The crankshaft velocity signal is then used to calculate the first piston position as is disclosed in U.S. patent application Ser. No. 09/620,014, which is incorporated herein by reference. Of course other methods for determining the location of the first piston can be used.

At act 507, the microprocessor 275 determines whether to inject an amount of fuel within the combustion chamber 185. The injection of the fuel begins at a calculated time period before the sparking event. If the piston's 170 position is before the location for injecting the fuel, then the software returns to act 505. However, if the piston's 170 position is at or after the location when to inject fuel, then the microprocessor 275 injects the fuel (act 508). The amount of fuel for injection has either been set when the microprocessor initialized the variables (act 500) or was calculated at act 610 (discussed below). The method of injecting the fuel can be by any known method as long as the total amount of fuel is properly injected.

At act 509, the microprocessor 275 determines the position of the first piston 170. The method of determining the position of the first piston 170 is similar to act 505.

At act 510, the microprocessor 275 determines whether to begin dwelling or storing energy within the ignition coil 245. The dwelling event begins at a calculated time period before the sparking event. Some of the parameters that are included when calculating the dwelling event include the amount of energy needed to allow the spark event to occur, the voltage of the battery, the engine speed, and similar criteria. If the piston's 170 position is before the location of when the dwelling event begins, the microprocessor 275 returns to act 509. However, if the piston's 170 position is at or after the location of when the dwelling event begins, the microprocessor 275 proceeds to store energy within the ignition coil (act 515)

At act 515, the microprocessor 275 provides a dwell signal to the first switch 240 of the spark generating circuit. By providing the dwell signal, a current is allowed to flow from the twelve-volt power source through the primary ignition coil 245 to ground. The current flow through the primary ignition coil 245 results in energy being stored within the primary ignition coil 245.

At act 520, the microprocessor 275 determines the position of the first piston 170. The method of determining the position of the first piston 170 is similar to act 505.

At act 525, the microprocessor 275 determines whether to fire the spark plug 220. Specifically, the software determines whether the piston 170 is at the proper position to have the spark event to occur. The position for the spark event has either been set when the microprocessor 275 initialized the variables (act 500) or was calculated at act 605 or 607 (discussed below). If the piston's 170 position is before the location of the spark event, then the software returns to act 515. If the piston's 170 position is at or after the location of when the sparking event occurs (e.g., five degrees before top-dead-center in the compression stroke), then the microprocessor 275 proceeds to act 530.

At act 530, the microprocessor stops providing a signal to the first switch 240. By removing the signal, the energy stored within the ignition coil 245 "looks" for a place to go to ground. The energy creates a current that flows from the secondary coil 250, to the spark plug 220, through the spark gap 230 to ground. The current flow through the spark gap creates a spark or spark signal (act 535) resulting in combustion.

After the occurrence of the spark event (act 535), the piston 170 continues to move within the cylinder 140. The resulting spark event (act 535) and the continued movement of the piston 170 results in an increased pressure within the combustion chamber 185. The increased pressure creates ions within the cylinder 140 (act 540). The ions result in an ion current that flows from the spark gap 230 through the secondary coil 250, through capacitor C1, through resistor R1, and the parallel path of resistor R2 and capacitor C2. The zener diode Z1, biases the ion current across the spark gap 230 with an eighty volt direct-current (DC) signal. The capacitor C1, filters the ion current to remove the DC bias. Resistor R1 and R2 and capacitor C2 create a voltage divider and filter resulting in an ion signal being created at point V1. The ion signal V1 corresponds to the ion current that is created across the spark gap (act 545). The ion signal is provided to the analysis module 205 for analysis.

The conditioning chip 270 receives the signal from the ion sensing circuit and conditions the ion signal to create a diagnostic signal, a knock intensity signal, and a peak hold signal. At act 550, the conditioning chip 270 applies the ion signal to the low-pass filter 285 to remove high frequency noise. The resulting signal is a diagnostic signal that is provided to the microprocessor 275 (act 555). The microprocessor 275 then determines whether to enable the knock control portion of the software (act 560).

Figure 5:
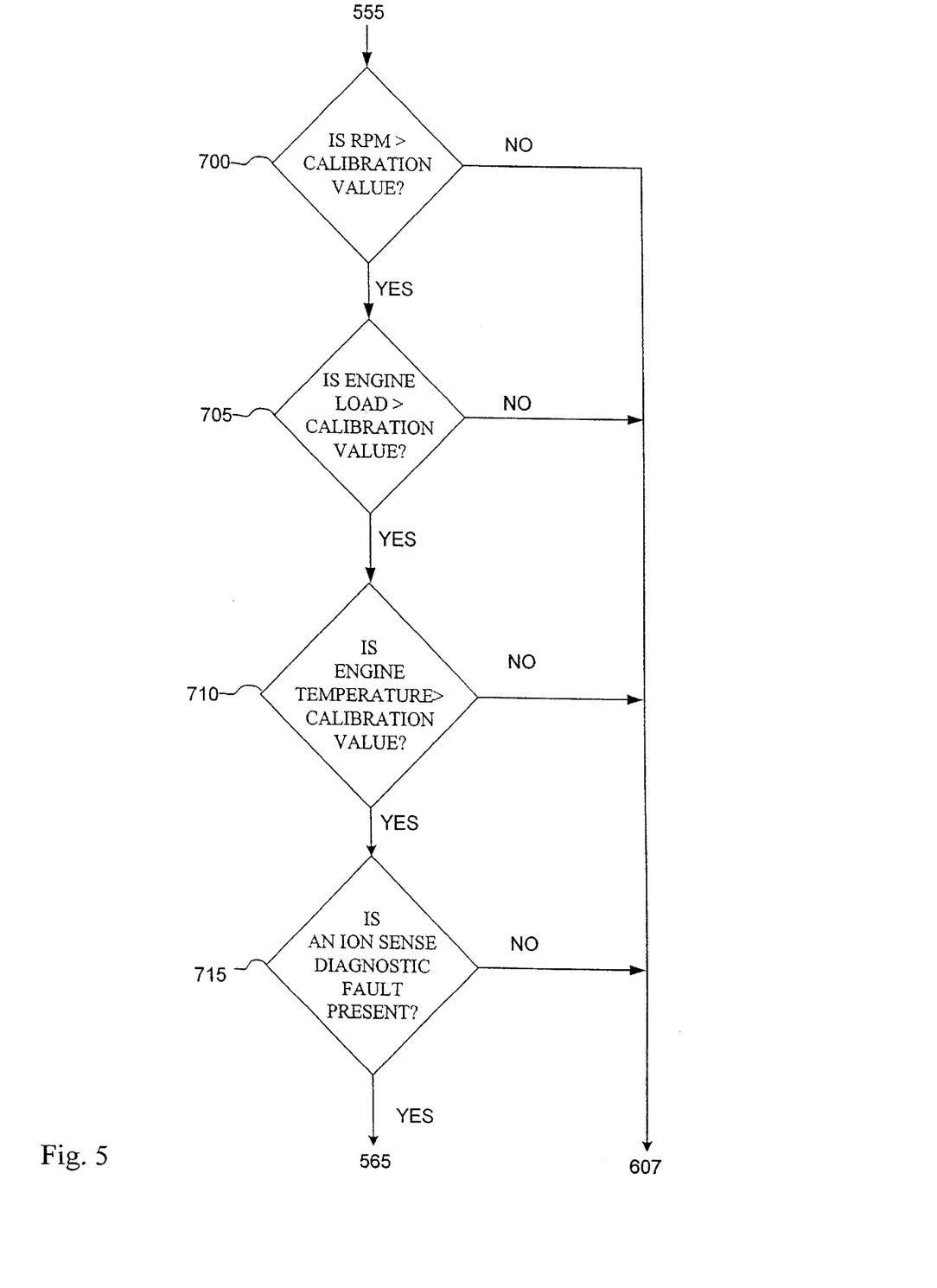
FIG. 5 is a flow chart implementing the act of enabling the knock control logic.

Act 560 is illustrated in more detail in FIG. 5. At act 700, the software calculates a current engine running speed (RPM) (e.g., from the crankshaft velocity sensor 196) and compares the current engine running speed with a minimum RPM calibration value. The RPM calibration value is the minimum RPM value required to implement the knock control portion of the program. If current engine running speed is greater than the minimum calibration value, then the software precedes to act 705. However, if the calculated RPM value is less then or equal to the minimum calibration RPM value then the software proceeds to act 607.

At act 705, the software calculates an engine load value (e.g., from a manifold pressure sensor) representing the load or the amount of force restricting the engine 130 from driving the wheel 115. The software compares the engine load value with a minimum engine load calibration value. The engine load calibration value is the minimum load value required to implement the knock control portion of the program. If engine load value is greater than the calibration engine load value, then the software precedes to act 710. However, if the engine load value is less then or equal to the minimum calibration load value then the software proceeds to act 607.

At act 710, the microprocessor 275 obtains an engine temperature value (e.g., from an engine temperature sensor) and compares the engine temperature value with a minimum engine temperature calibration value. The engine temperature calibration value is the minimum engine temperature required to implement the knock control portion of the program. If engine temperature value is greater than the calibration engine temperature value, then the software precedes to act 715. However, if the engine temperature value is less then or equal to the calibration engine temperature value then the software proceeds to act 607.

At act 715, the microprocessor 275 analyzes the diagnostic signal to determine whether a diagnostic fault is present. For example, the software may determine from the diagnostic signal that a spark event has not occurred. If the software determines that a spark event has not occurred, then the software determines a diagnostic fault is present. If the software determines a diagnostic fault is present, then the software will proceed to act 607. However, if no diagnostic fault is present, the software proceeds to act 565 which enables the knock control portion of the software.

Figure 4C:
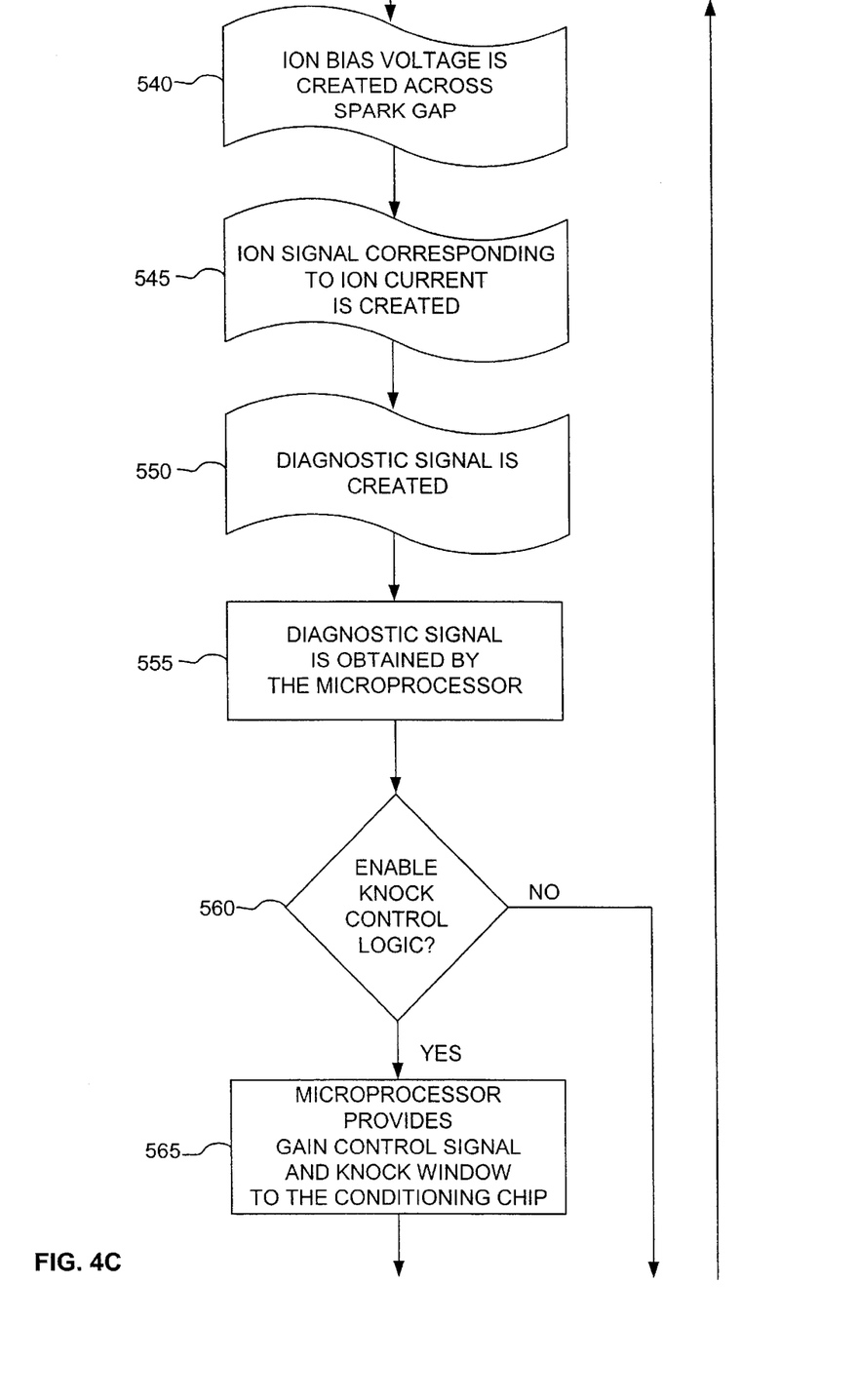

Referring to FIG. 4c, at act 565, the microprocessor 275 provides a gain control signal to the conditioning chip 270 for setting the gain of the low-pass filter 285. The gain control signal is based in part on the diagnostic signal. If the software determines that the diagnostic signal is not properly within an expected voltage range, then the microprocessor 275 will set the gain control signal accordingly. In addition, at act 565, the software provides a knock window to the conditioning chip 270. The knock window is calculated by the software program and is based on a number of variables including RPM, engine load, and spark timing. The knock window is provided to the integrator 295 and is the "window" used by the integrator to obtain an integrated value (i.e., the knock intensity value, discussed below). It should be understood that the gain control signal and the knock intensity signal can be continuously provided to the conditioning chip 270 throughout the implementation of the software program.

Figure 6A:
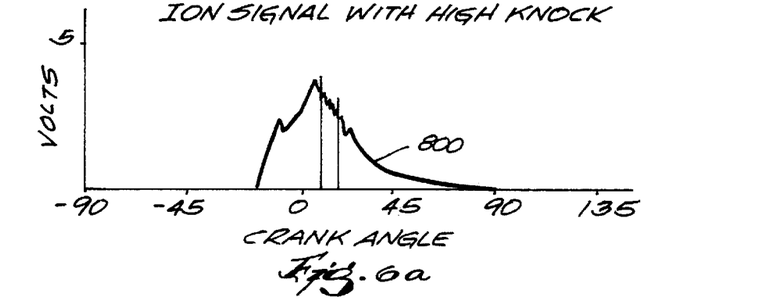
FIGS. 6a–6d are sample voltage vs. crank angle graphs of the ion signal and of the band-pass signal.
Figure 6B:
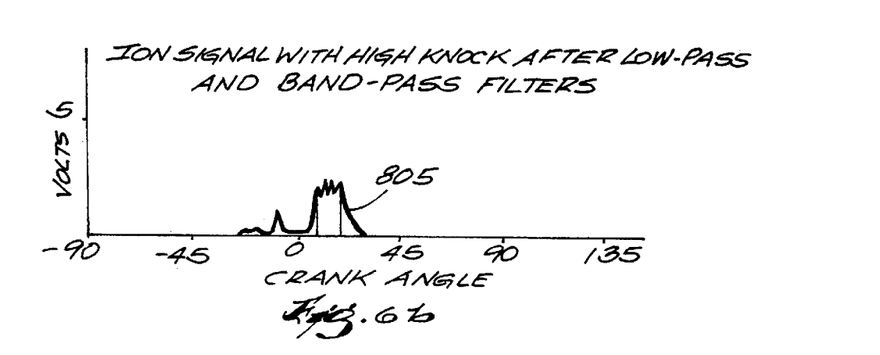
Figure 6C:
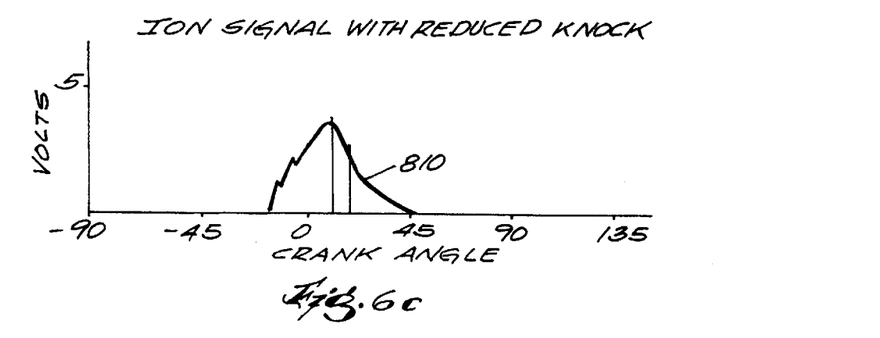
Figure 6D:
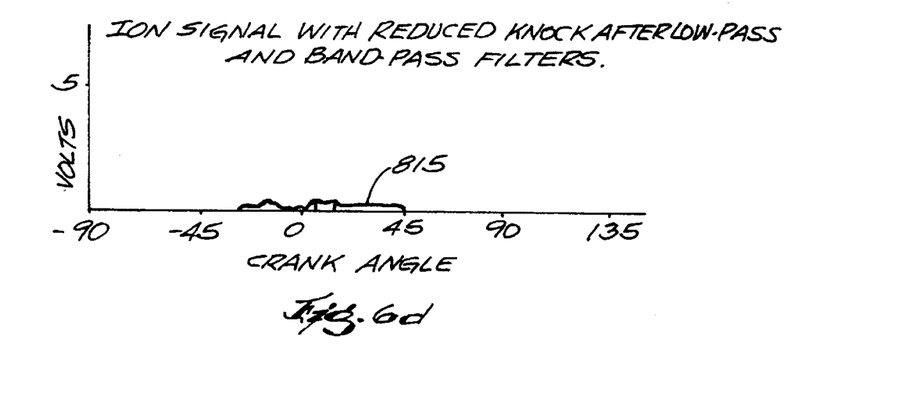

At act 575, the conditioning chip 270 applies the signal resulting from the low-pass filter 285 to a band-pass filter 290. The band-pass filter 290 passes a band-pass signal having frequencies within a frequency range. The frequency range is the expected knock frequency of a knock portion in the ion signal. For example, referring to FIG. 6a, a first example ion signal 800 including a knock portion having high knock is shown. After being applied to the low-pass filter 285 and the band pass filter 290, the first ion signal 800 results in a first band-pass signal 805. As shown in FIG. 6b, a second example ion signal 810 having a knock portion with little or no knock is shown. After being applied to the low-pass filter 285 and the band pass filter 290, the second ion signal 810 results in a second band-pass signal 815. As can be seen from FIGS. 6a and 6b, the resulting band-pass signals 805 and 815 vary depending on the amount of knock within the ion signal.

Referring back to FIG. 4d, at act 580, the resulting band-pass signal is provided to a peak-hold detector 305. The peak-hold detector 305 obtains a peak-knock intensity value. The peak-knock intensity value is provided to the microprocessor 275 and is used by the microprocessor 275 to determine whether the ion signal contains noise spikes.

At act 585, the resulting signal from the band-pass filter 290 is applied to integrator 295. The integrator 295 integrates the energy of the applied signal over the knock window resulting in a knock intensity signal having a knock intensity value. The knock intensity value represents the amount of knock energy within the ion signal. For the examples shown in FIGS. 6a and 6b, the knock window is between 5 degrees and 15 degrees after top-dead-center.

At act 590 (FIG. 4d), the software calculates a peak ignore threshold value which may be a predetermined value or can be a value calculated as a function of engine speed (RPM) and average knock intensity of previous sparking events. The software then compares a ratio of the peak-knock intensity and the knock intensity value with the peak ignore threshold (act 590). If the software determines that the ratio is greater than the peak ignore threshold, then the ion signal contains noise spikes and the microprocessor 275 will not record the knock intensity for the current spark event (i.e., proceeds to act 607). If the microprocessor 275 determines that the ratio is less then or equal to the peak ignore threshold, then the software determines that the ion signal does not contain noise spikes and proceeds to act 595.

Figure 4D:
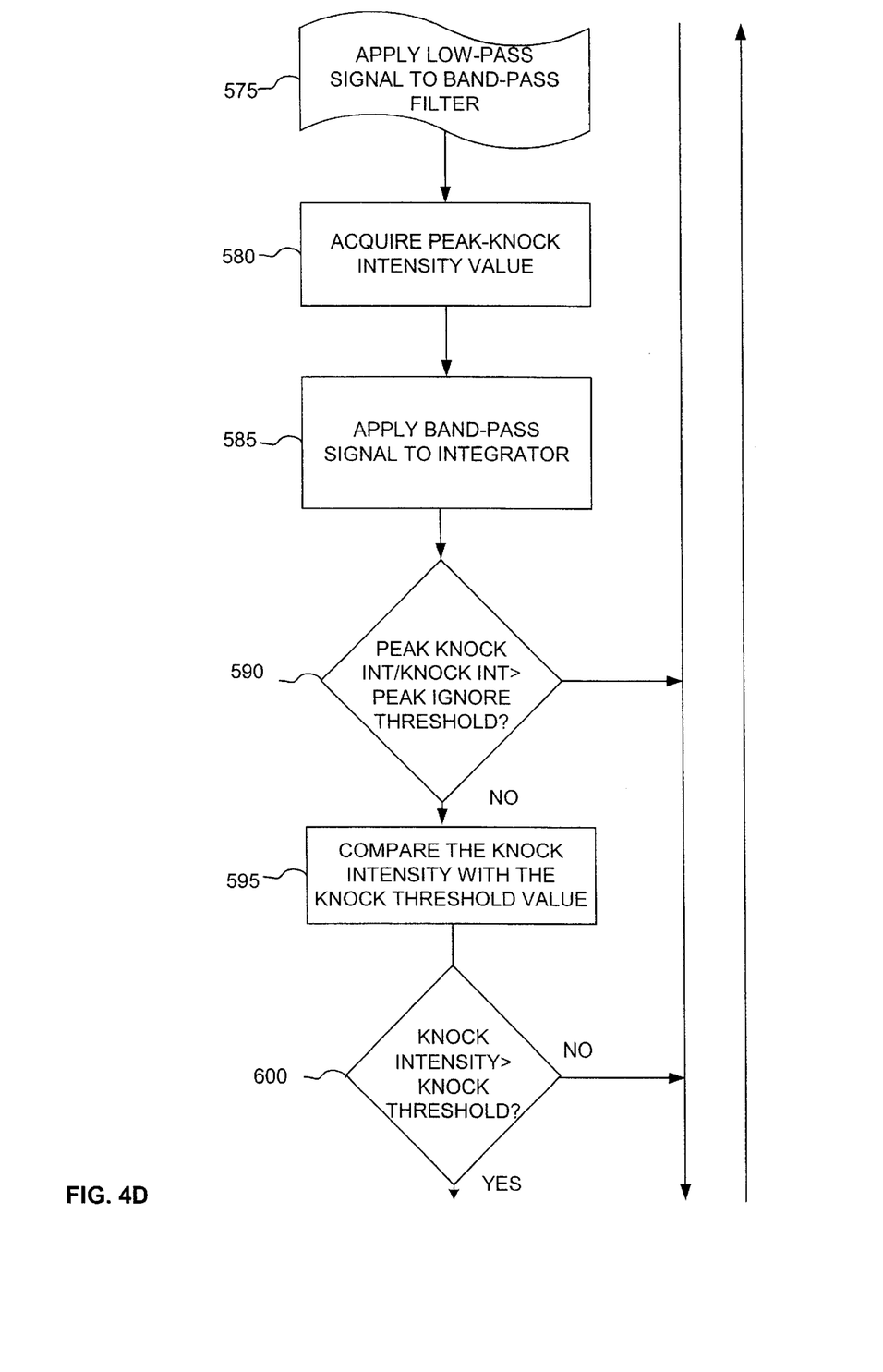

At act 595, the software compares the knock intensity value with a knock threshold value. The knock threshold value can be a predetermined constant or can be a continuously calculated value for each spark event. For example, the knock threshold value can be a function of a running average of previously recorded knock intensity values and engine speed (RPM). If the knock intensity value is greater than the knock threshold value (act 600), then the software determines knock is present. Conversely, if the knock intensity value is equal to or less than the knock threshold value (act 600), then the microprocessor determines knock is not present. Of course, if the microprocessor has recorded a history of knock values, then the microprocessor may require multiple "knock confirmations" before determining knock is present. By requiring multiple knock confirmations, the software allows for an occasional unexpected knock spike.

Figure 4E:
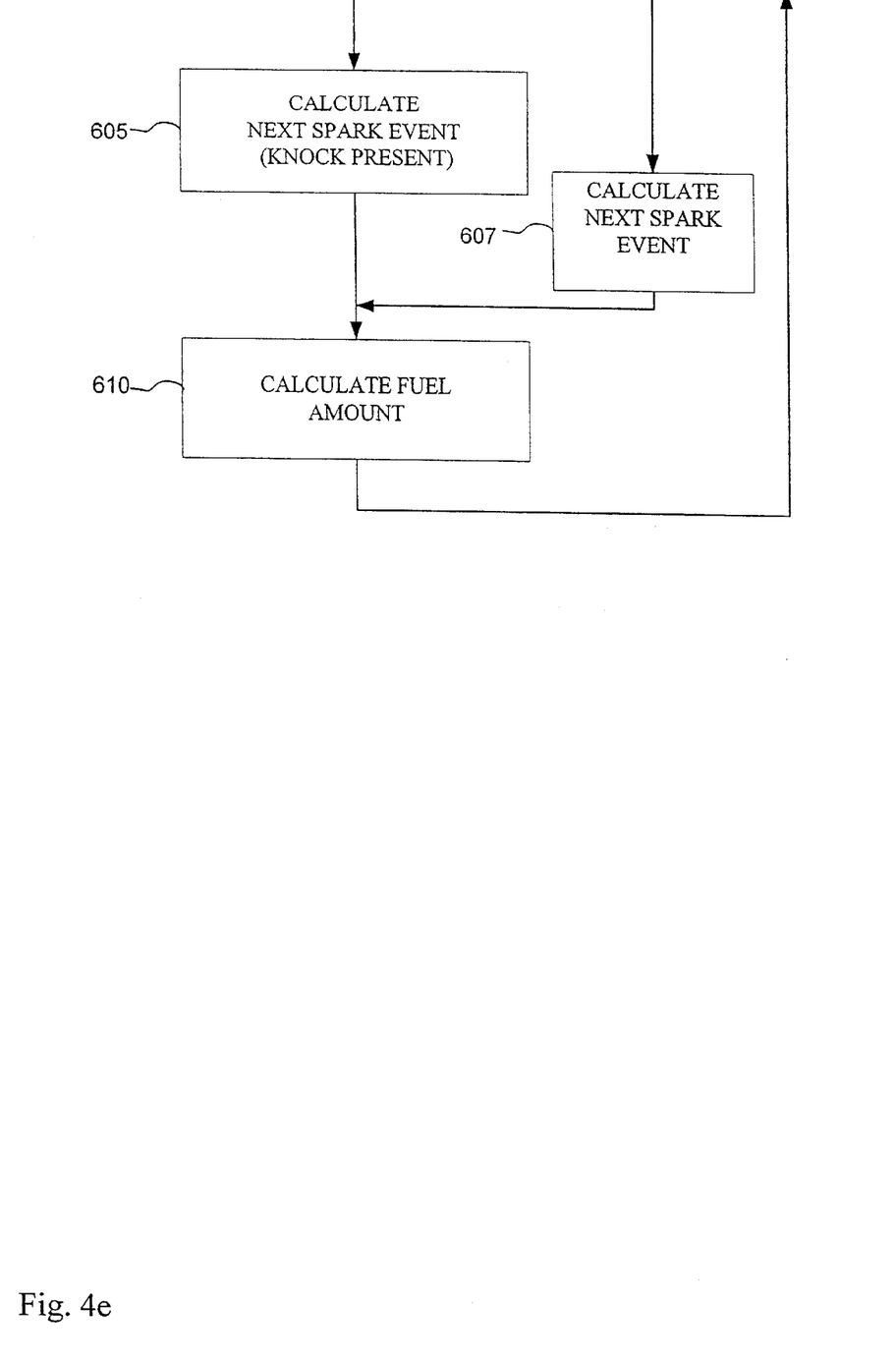

At act 605, the software calculates a piston position for the next spark event. The new spark event position can be calculated by various different methods. One method has the microprocessor "retard" the event by a predetermined number of degrees. A second and more preferable method has the microprocessor retard the spark event by a non-predetermined number of degrees. For the second method, the software can calculate a new spark event position with one of the variables being the amount of knock greater than the threshold value. For example, if the knock value is greater than the threshold value by (×1), then the spark event may be retarded by two degrees. Alternatively, if the knock value is greater than the threshold value by (×2), then the spark event may be retarded by four degrees. Even further, the software may implement an equation for determining the new spark event with one of the variables being the difference between the knock value and the threshold value.

In addition, the software preferably continues to retard the spark event until the knock has ceased, or until the spark event position is at a maximum spark event position. If the software determines that knock is not present, then the software slowly returns the spark event position to its original spark event position (act 607). Alternatively, once the knock has ceased, the software can abruptly return the spark event back to its original spark event position (act 607). The motivation for returning the spark event back to its original position as quickly as possible is that retarding the spark event causes the engine to lose power. By returning the spark event back to normal, the engine can provide its maximum amount of power for the engine speed.

At act 610, the software calculates an amount of fuel for the next spark event. Preferably, if the spark event position is at a max spark event position, then the amount of fuel for the next spark event is increased. Increasing the amount of fuel is typically referred to as fuel enriching. By adding more fuel to the combustion chamber 185, the excess fuel does not entirely combust, and heat from the combustion chamber 185 is transferred to the uncombusted fuel. When the excess fuel exhausts, some of the heat within the chamber 185 exhausts with the fuel. This results in the chamber 185 running at a cooler temperature and, consequently, reducing the susceptibility for knock within the cylinder 140. Similar to calculating the new spark event position, the new amount of fuel can be a predetermined amount or can be calculated by the software. Of course, although the amount of fuel preferably varies after the spark event position is at a max spark event position, the software can vary the spark event timing and the amount of fuel concurrently.

After act 610, the software returns to act 505 and initiates the next combustion event. Of course the software performs additional acts normal to the combusting process which are not shown (e.g., exhausting the combustion chamber).

As can be seen from the above, the present invention provides a motorcycle having a system for combustion knock control. Various features and advantages of the invention are set forth in the following claims.

What is claimed is:

1. A motorcycle comprising:
    a frame;
    an engine mounted to the frame, the engine including a
        housing, a crankshaft mounted for rotation within the housing, a cylinder having a combustion chamber and a piston reciprocating in the cylinder;

a spark generating circuit including a spark plug having a spark gap exposed to the combustion chamber, the spark generating circuit producing a spark across the spark gap in response to a sparking signal;

an ion signal circuit including two conductors having a signal gap exposed to the combustion chamber, the ion signal circuit generating an ion signal indicative of an ion current across the signal gap; and an analysis module electrically connected to the ion signal circuit and the spark generating circuit, the analysis module generating the sparking signal in a timed sequence, receiving the ion signal from the ion signal generating circuit, measuring a knock intensity within the ion signal, and modifying the timing sequence in response to an indication of knock in the cylinder.

2. A motorcycle as set forth in claim 1 wherein the signal gap is the spark gap.

3. A motorcycle as set forth in claim 1 and further comprising:

a fuel injector including a fuel injector circuit, the fuel injector providing an amount of fuel to the combustion chamber in response to a fuel injector signal being provided to the fuel injector circuit; and wherein the analysis module is electrically connected to the fuel injector circuit, and wherein the analysis module generates the fuel injector signal and modifies the fuel injector signal in response to an indication of knock in the cylinder.

4. A motorcycle as set forth in claim 1 wherein the ion signal generating circuit comprises a resistor connected in circuit and having an end electrically connected to the analysis module, wherein the end of the resistor has a voltage, and wherein the ion signal is related at least in part to the voltage.

5. A motorcycle as set forth in claim 1 wherein the analysis module comprises:

a low-pass filter that receives the ion-signal from the ion signal generating circuit and passes a low-pass signal;

a band-pass filter having a frequency window, the band-pass filter receiving the low-pass signal and passing a band-pass signal that is within the frequency window; and an integrator that receives the band-pass signal and provides an integrator signal indicating the amount of energy in the band-pass signal.

6. A motorcycle as set forth in claim 5 wherein the analysis module further comprises:

a microprocessor electrically connected to the integrator, the microprocessor receiving the integrated signal and implementing a software program for determining whether the integrated signal represents knock being present within the cylinder.

7. A motorcycle as set forth in claim 1 wherein the engine is an air-cooled engine.

8. A motorcycle as set forth in claim 1 wherein the engine is a two-cylinder engine.

9. A motorcycle as set forth in claim 8 wherein the two-cylinder engine is a V-twin engine.

10. A motorcycle as set forth in claim 1 wherein the analysis module comprises a microprocessor.

11. A motorcycle comprising:

a frame;

an engine mounted to the frame, the engine including a housing, a crankshaft mounted for rotation within the housing, a cylinder having a combustion chamber and a piston reciprocating in the cylinder;

a spark generating circuit including a spark plug having a spark gap exposed to the combustion chamber, the spark generating circuit producing a spark across the spark gap in response to a sparking signal;

an ion signal circuit including two conductors having a signal gap exposed to the combustion chamber, the ion signal circuit generating an ion signal indicative of an ion current across the signal gap; and a conditioning chip that receives the ion signal and generates a knock intensity signal; and a processor and software for operating the processor to provide the sparking signal at a timed sequence, to determine whether the knock intensity signal represents knock, and to modify the timed sequence in response to an indication of knock in the cylinder.

12. A motorcycle as set forth in claim 11 and further comprising:

a fuel injector circuit that produces a fuel injector signal, the fuel injector circuit providing an amount of fuel to the combustion chamber in response to the fuel injector signal; and wherein the software further operates the processor to initiate the fuel injector signal at a second timed sequence and to modify the second timed sequence in response to the indication of knock in the cylinder.

13. A motorcycle as set forth in claim 11 wherein the conditioning chip comprises:

a low-pass filter that receives the ion-signal from the ion signal generating circuit and passes a low-pass signal;

a band-pass filter having a frequency window, the band-pass filter receiving the low-pass signal and passing a band-pass signal having a frequency that is within the frequency window; and an integrator that receives the band-pass signal and provides an integrator signal indicating the amount of energy in the band-pass signal generating the knock intensity signal.

14. A motorcycle as set forth in claim 11 wherein the engine is an air-cooled engine.

15. A motorcycle as set forth in claim 11 wherein the engine is a two-cylinder engine.

16. A motorcycle as set forth in claim 15 wherein the two-cylinder engine is a V-twin engine.

17. A motorcycle as set forth in claim 11 wherein the signal gap is the spark gap.

18. A method of controlling knock in a motorcycle, the method comprising the acts of:

providing a motorcycle including a frame, front and rear wheels coupled to the frame for rotation with respect to the frame, an engine mounted to the frame, the engine including a housing, a crankshaft mounted for rotation within the housing, a cylinders having a combustion chamber, and a piston reciprocating in the cylinder, and a spark generating circuit including a spark plug having a spark gap exposed to the combustion chamber;

generating a first spark in the combustion chamber with the spark plug when the piston is in a first position;

obtaining an ion signal indicative of an ion current across the spark plug gap;

determining if the ion signal indicates knock within the cylinder; and generating a second spark in the combustion chamber with the spark plug when the piston is in a second position and in response to an indication of knock in the cylinder, whereby the second position is different than the first position.

19. A method as set forth in claim 18 wherein the act of determining if the ion signal indicates knock comprises the acts of:

applying the ion signal to a low-pass filter to produce a low-pass signal;

applying the low-pass signal to a band-pass filter having a frequency range to produce a band-pass signal;

applying the band-pass signal to an integrator to produce an integrated signal having an energy value representing an amount of energy within the band-pass signal;

providing a threshold value; and determining if the energy value is greater than the threshold value.

20. A method as set forth in claim 18 and further comprising calculating the second position in response to the energy value being greater than the threshold value.

21. A method as set forth in claim 18 and further comprising:

enriching the air/fuel mixture in order to reduce knock.

22. A method as set forth in claim 18 and further comprising:

conditioning the ion signal to create a diagnostic signal; and determining whether a diagnostic fault is present based at least in part on the diagnostic signal.

* * * * *